United States Patent [19]

Macy

[11] Patent Number: 4,724,508

[45] Date of Patent: Feb. 9, 1988

[54] METHOD AND APPARATUS FOR THE CONTINUOUS CORONA DISCHARGE TREATMENT OF THE SURFACE OF FORMED ARTICLES

[75] Inventor: Johnathan I. Macy, Holdrege, Nebr.

[73] Assignee: Becton, Dickinson and Company, Franklin Lakes, N.J.

[21] Appl. No.: 810,111

[22] Filed: Dec. 18, 1985

[51] Int. Cl.⁴ .............................................. H01T 19/00
[52] U.S. Cl. ................................................... 361/225
[58] Field of Search .............. 361/213, 214, 225, 229, 361/230, 231; 422/906, 189.05

[56] References Cited

U.S. PATENT DOCUMENTS 3,716,755  2/1973  Marx ..................................... 361/229
4,194,232  3/1980  Cumming et al. .............. 361/214 X
4,502,093  2/1985  Saurenman ......................... 361/231

FOREIGN PATENT DOCUMENTS 1238653  4/1967  Fed. Rep. of Germany ...... 361/230

*Primary Examiner*—L. T. Hix
*Assistant Examiner*—D. Rutledge
*Attorney, Agent, or Firm*—Richard J. Rodrick

[57] ABSTRACT

A method and apparatus for treating the surface of a formed plastic article comprises creating an ionized field and causing air to flow through the field. A formed plastic article is moved through the field and the airflow so that the ionized field circumscribes the peripheral surface of the article to cause the molecular structure of the surface of the article to be modified. Articles made in accordance with the above method also fall within the purview of the invention.

37 Claims, 7 Drawing Figures

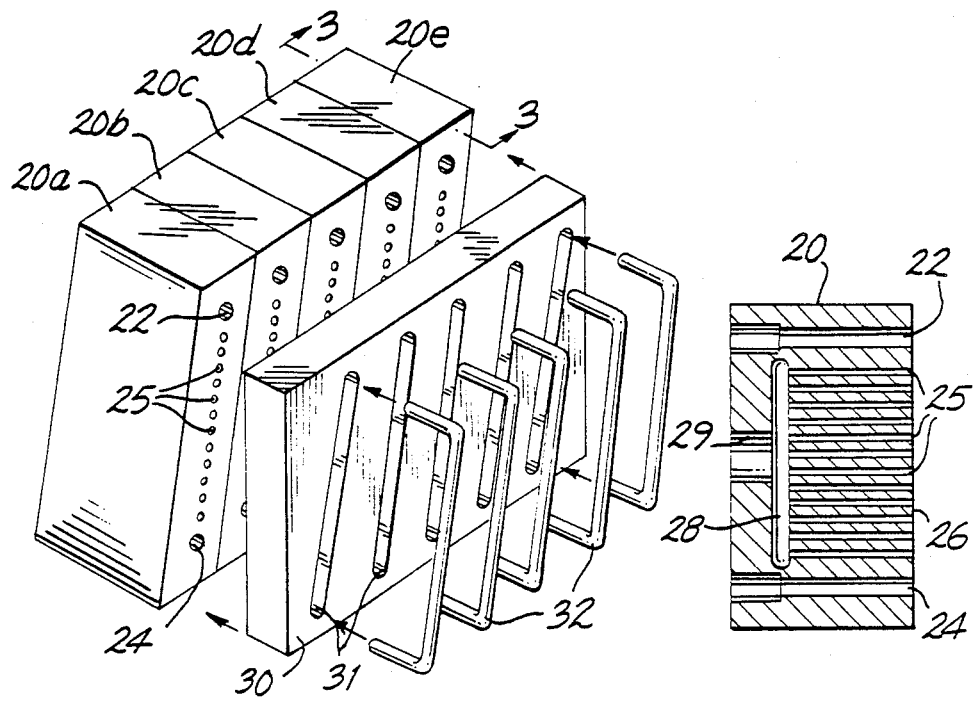
FIG. 2
FIG. 3
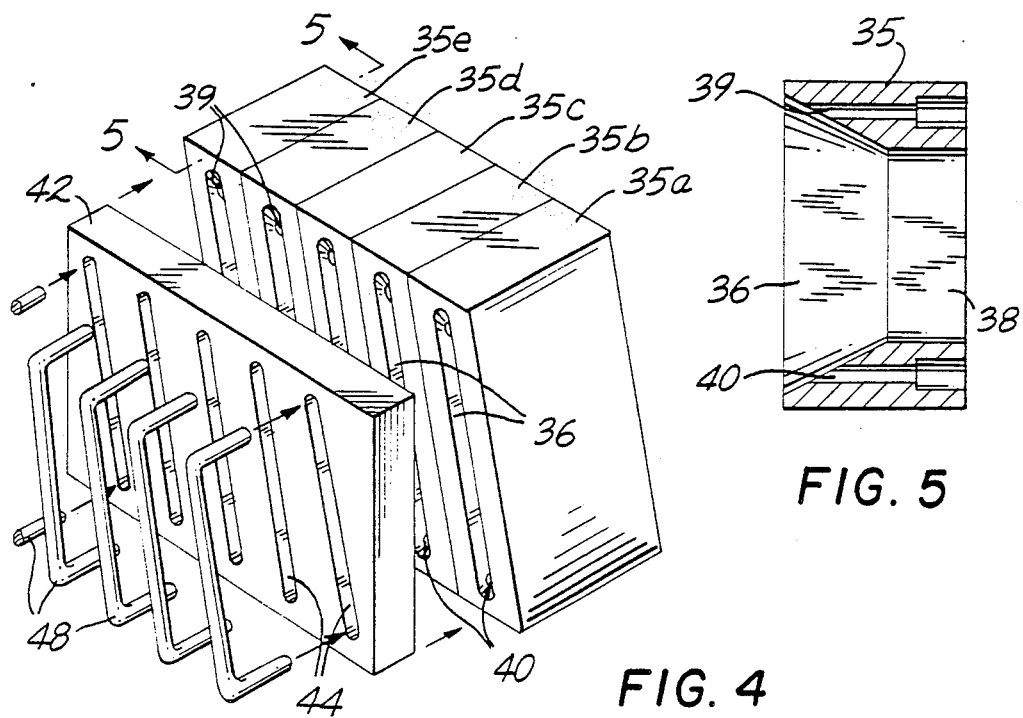
FIG. 4
FIG. 5

METHOD AND APPARATUS FOR THE CONTINUOUS CORONA DISCHARGE TREATMENT OF THE SURFACE OF FORMED ARTICLES

BACKGROUND OF THE INVENTION

1. Field of the Invention

The present invention relates to the surface treatment of plastic articles, and more particularly, concerns a method and apparatus for treating a surface of a plastic article so that the surface has enhanced printing and adhesion characteristics. The present invention also relates to the articles made in accordance with the method of the invention.

2. Description of the Prior Art

In the use of plastic materials for packaging, containers, tubular structures, medical products and a variety of other products and uses, it is desirable to print on the surface of these plastics. The most common approach for printing on the surface of plastics, such as polyethylene, involves printing inks. These inks, however, have not satisfactorily adhered to the normal surface of the plastic articles onto which printing is desired. As a result, not only was the quality of the printing poor, but the ink could be readily rubbed off the surface of the article.

Investigators about thirty years ago determined that surface treatment of the plastic would enhance printability and adhesion of the printing inks. In particular, a corona discharge treatment of the surface of polyethylene films was found to improve the compatibility of the surface with printing inks. To achieve such surface treatment by the corona discharge approach, the plastic material is introduced into a region of ionized air in a gap between two charged electrodes. High-energy particles bombard the surface of the plastic material in the ionized region. Covalent bonds on the surface of the material are broken as a result of the particle bombardment energies developed in the ionized region. Free radicals that are formed on the surface rearrange to form functional groups which directly affect surface wetting and adhesion. Molecular transformations and dissociations may form species with a chemically altered surface favorable for adhesion. Increased adhesion is the result of an electrical formation induced in the polymeric material by the corona discharge. In simplified terms, the particle bombardment on the surface of the plastic material creates microfissures, increased porosity and polar groups which improve adhesion and surface wettability characteristics.

Although the knowledge and techniques of corona discharge treatment of plastic materials have been in existence for approximately thirty years, there is no known technique, process or equipment for the treatment of individual or formed plastic articles that are in continuous motion, preferably at high speeds which would be desirable for many commercial automated operations. It has been known, for example, to treat the surfaces of plastic films, such as polyethylene, which are moving through the corona discharge region. British Pat. No. 765,545 discloses such a process in which the surface of a polyethylene or other plastic film is treated to render it receptive to receive printing ink, coloring, adhesive or the like. In U.S. Pat. No. 4,392,178, an apparatus is described for rapidly enhancing the piezoelectric properties of polar polymeric films by continuous corona poling thereof. In the patented invention a field-intensified ionization (corona) source of voltage repeatedly traverses the moving polarizable polymer to result in fewer breakdowns of the polymer film when compared to prior art static corona apparatuses.

Various types of research or testing have been performed by investigators to correlate the effects of corona treatment and the increase in adhesion characteristics. For instance, Baum et al. reported on research which they performed on the decay of surface potential of negative corona charged polyethylene films, "Further Observations on the Decay of Surface Potential of Corona Charged Polyethylene Films," *J. Phys. D.: Appl. Phys.*, vol. 10, 1977, pp 2525–2531. Baum et al. employed an airstream directed along the surface of the polyethylene film during the corona discharging. Polyethylene films were also corona discharge treated by Carley et al. in order to study the adhesion phenomena produced by the corona treatment, "Corona-Discharge Treatment of Polyethylene Films. 1. Experimental Work and Physical Effects," *Polymer Engineering and Science*, March 1978, vol. 18, number 4, pp 326–334. Stradal et al. also conducted adhesion experiments on low density polyethylene sheet for evaluating the effect of corona treatment in oxygen, nitrogen, helium and argon on ink adhesion to the polyethylene sheet, "The Effect of Corona and Ozone Treatment on the Adhesion of Ink to the Surface of Polyethylene," *Polymer Engineering and Science*, January 1977, vol. 17, no. 1, pp 38–41. Ehrbar et al. studied the application of corona discharge on the metalization of plastic materials, in order to promote good adherence between the plastic material and the metallic coating, "Using Corona Discharge to Deglaze Plastic Films Before Metalizing," *Plating and Surface Finishing*, February 1980, pp 64–66.

Even though the surface treatment of moving plastic films has been known in order to enhance printing and adhesion characteristics, there are no known techniques which treat moving articles such as containers, packages, tubes or other structural bodies which are formed independently of each other and are moving through the treatment zone. When continuous plastic films are treated to improve printability or adhesion, the effect of the corona discharge process is to modify one side or surface of the film so that the printing ink on th modified surface will print and adhere in improved fashion. On the other hand, containers, packages, tubes and the like have many sides, or one continuous side or surface if the the container is round or cylindrical, onto which printing is desirable. Therefore, since finished or formed articles made out of plastic such as polyethylene, polypropylene and the like, need to be treated around the entire peripheral surface (360° coverage), the known techniques of treating flat films are inapplicable in many respects.

For instance, Baum et al., mentioned above, found that when air was blown across the surface of a film sample they were able to increase the charged area by 50%. They also reported that when charging is performed in moving air, excited molecules will be dispersed and their influence will be greatly reduced. Therefore, they reasoned that the time requirement to produce sufficient charging will be increased due to the dispersion of the excited molecules. Similarly, when charging is performed on a moving substrate, as opposed to moving air, the number of excited molecules striking the surface is dramatically reduced. The photons that are generated in a corona discharge are not deflected by a current of air. As a result, photon bombardment tends to create high and low intensity treatment areas between the electrodes.

Such high and low intensity treatment areas are, however, magnified with the introduction of a nonuniform, geometrically configured substrate or article. Difficulty thus results in treating the surface of a geometrically configured article that is positioned next to the electrode without rotation of the article itself, if the presently known corona treatment processes are employed. Furthermore, it is known that present corona treatment processes employ a very small airflow to help initiate the corona field. This airflow is typically directed transversely across the substrate. This airflow tends to deflect the excited gas molecules away from the substrate so that photons are relied upon solely for surface treatment. This results in a nonuniformly treated surface which is unacceptable for treating articles which need 360° coverage for improved adhesion characteristics.

Other problem areas also arise in the employment of corona discharge treatment apparatuses. Heat generated by the electrodes during operation must be controlled, otherwise the energy dissipated by the discharge may quickly overheat the substrate and cause premature failure of the dielectric electrode covering. This, in turn, creates a nonuniform corona field with hot spots which ultimately causes an electric arc. Also, ozone is a bi-product of corona discharge. Insofar as the production of ozone is an environmental hazard and regulated by law, ozone containment is a requirement for corona discharge treatment equipment.

It can be seen improvements are still needed and being sought to improve surfaces of plastic materials for the enhancement of printing and adhesion. Such improvements would be most desirable to treat the surfaces of formed plastic articles, as individual components, particularly at speeds suitable for automated commercial production capabilities. It is to such improvements, processes and articles that the present invention is directed.

SUMMARY OF THE INVENTION

The method of the present invention for treating the surface of a formed plastic article comprises creating an ionized field. Air is caused to flow through the field. The method includes moving a formed plastic article through the field and the airflow so that the ionized field circumscribes the peripheral surface of the article to cause the molecular structure of the surface of the article to be modified.

In a preferred embodiment of this aspect of the invention, a method for treating surfaces of formed plastic articles comprises creating an electrically-charged corona field by providing a plurality of pairs of electrodes. Each electrode of a pair is located in sufficiently close proximity to its opposing electrode to produce a corona discharge between the electrodes. Further, each pair of electrodes is aligned side-by-side in a spaced relationship so that a zone of treatment is established between opposing electrodes. Air is caused to flow through the zone in a direction which is transverse to the direction that the articles move through the zone. This preferred method includes moving a plurality of formed plastic articles through the zone in a continuous motion with each article passing through the zone in succession and in spaced relationship to each other. A plastic pipe can be passed through the zone in a continuous manner. Each article has a peripheral surface which is circumscribed by the charged field when passing through the treatment zone whereby the corona discharge causes a molecular modification of the surface of each article.

The present invention includes an article or articles produced in accordance with the methods described above.

Another aspect of the present invention is an apparatus for the surface treatment of a formed plastic article. This apparatus comprises a treatment zone for the passage of formed plastic articles therethrough. Means are provided for creating an electrically-charged corona field in the treatment zone. Airflow means causes air to flow through the zone of treatment. When a formed plastic article having a peripheral surface is moved through the zone, the aforementioned means cooperate to cause the charged field to circumscribe the entire peripheral surface of the article whereby the corona discharge causes a molecular modification of the surface.

In accordance with the principles of the present invention, a method and apparatus provide for the continuous corona discharge treatment of the surface of a formed article. The techniques of the present invention may be applied to most forms of production where printing, adhesive bonding and increased surface wetting tension are required. In particular, the present invention is most suitable for the corona discharge surface treatment of continuously moving articles, preferably at high speeds for viable commercial production. Therefore, the treatment of articles in the form of packages, containers, tubes, pipes, medical products such as syringe barrels, catheter tubing, and a variety of other formed articles, in accordance with the present invention, significantly improves the ink printing on the surfaces of plastic articles. It is appreciated that an increase in ink adhesion will greatly reduce the amount of line scrap and rejected product due to poor print quality. The treatment of the present invention increases the overall durability of the print since the print is much more difficult to rub off during processing, handling and shipping. Another advantage of the present invention is that previously unprintable surfaces caused by surface oil or the like may now be printed after treatment of those surfaces in accordance with the present invention, with no noticeable differences in print quality. In plastic medical products which are sterilized by irradiation, poor print adherence is significantly reduced by virtue of the present treatment techniques.

One of the results of the method of the present invention is that the surface wetting tension of the plastic article is increased. The increase in surface wetting tension causes the print on the plastic surface to appear clearer and darker. In addition, increased surface wetting tension allows for different forms of printing to be utilized which might otherwise be impossible or difficult without the present treating operation. The present invention further lends itself to high speed conveyer or transport operations which carry individual or independent articles through an automated commercial production operation. Other advantages of the present invention will become more apparent upon a reading of the detailed description below.

BRIEF DESCRIPTION OF THE DRAWINGS

FIG. 2 is an exploded perspective view of the positive pressure cartridges and plate illustrated without the electrodes in place;

FIG. 3 is a cross-sectional view taken along line 3—3 of FIG. 2, of a positive pressure cartridge;

FIG. 4 is an exploded perspective view of the negative pressure cartridges and plate illustrated without the electrodes in place;

FIG. 5 is a cross-sectional view, taken along line 5—5 of FIG. 4, of a negative pressure cartridge;

DETAILED DESCRIPTION

Figure 1:
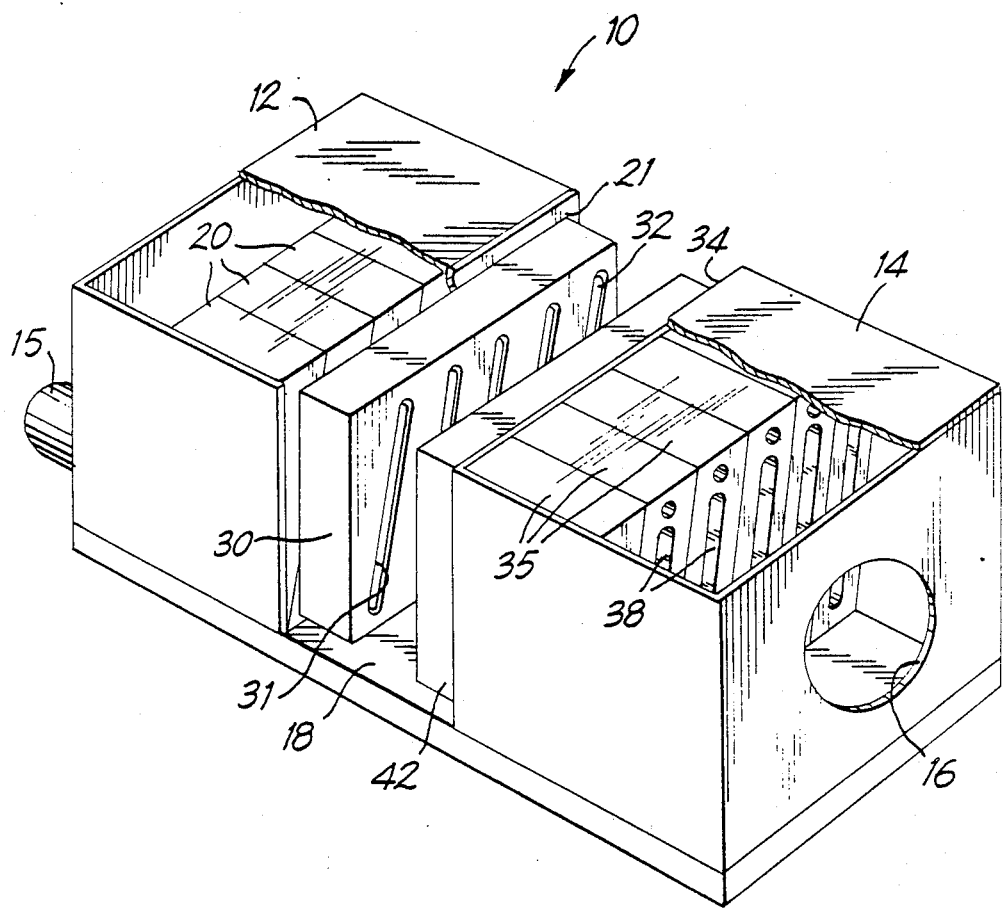
FIG. 1 is a perspective view of the preferred apparatus of the present invention for the surface treatment of a formed plastic article, shown with partial cut-away views of the top sections of both the positive and negative pressure sides of the apparatus.

While this invention is satisfied by embodiments in many different forms, there is shown in the drawings and will herein be described in detail a preferred embodiment of the invention with the understanding that the present disclosure is to be considered as exemplary of the principles of the invention and is not intended to limit the invention to the embodiment illustrated. The scope of the invention will be measured by the appended claims and their equivalents.

Referring now to the drawings, and FIG. 1 in particular, there is illustrated a preferred embodiment of an apparatus 10 for the surface treatment of a formed plastic article in accordance with the present invention. Apparatus 10 may take the shape of a box-like structure and includes a positive pressure side 12 and a negative pressure side 14. Both the positive and the negative pressure sides of apparatus 10 are preferably formed as enclosures which house the electrical power supplies, circuitry and cartridges for the electrodes of the apparatus as hereinafter described. In addition, positive pressure side 12 includes an air connector 15 which permits connection to an air supply (not shown) so that air under pressure may be delivered to the positive pressure side of the apparatus. The positive pressure delivered to side 12 may vary according to the particular airflow requirements of the particular treatment operation which is occurring.

Negative pressure side 14, in addition to housing the electrical power and circuitry elements and the cartridges for the electrodes, includes a relatively large hole or opening 16 for connection to a vacuum system (not shown) for drawing air through the box-like housing of the negative pressure side. Together, the positive air pressure in side 12 and the negative air pressure in side 14 cooperate to cause air to flow transversely across a zone 18 which separates positive pressure side 12 from negative pressure side 14 of the instant apparatus. More details of this airflow will be provided hereinafter.

It can also be seen in FIGS. 1 and 2 that there are a series of positive pressure cartridges 20, in the embodiment being described, five in number, each of the separate cartridges designated by the suffixes a through e. Each cartridge 20 is aligned in a side-by-side arrangement along the inside wall 21 of positive pressure side 12. All of these cartridges are substantially the same and are mounted against wall 21 so as to be interchangeable or replaceable either for different treatment procedures or in the event of any defect in the components. Also, if fewer than five cartridges are required for some treatment operations, some of the cartridges may be readily removed. It should be pointed out that the five cartridges illustrated in the drawings are merely exemplary of the number of cartridges which may be employed depending upon the specific treatment at hand.

As more clearly seen in FIGS. 2 and 3, each cartridge 20 includes a number of holes extending from the front of the cartridge to the back of the cartridge. There are two larger holes 22 and 24 in each cartridge, and these holes receive the legs of the electrodes, which preferably have an elongated, U-shape configuration. Between holes 22 and 24 are a number of smaller holes 25 which extend from the front surface 26 of positive pressure cartridge 20 into an internal manifold or cavity 28 near the back of the cartridge. A passageway 29 communicates with air manifold 28. Thus, pressurized air which enters positive pressure side 12 through connector 15 enters passageway 29 and air manifold 28, and then the air travels through each of smaller openings 25. Although not shown in the drawings, each positive pressure cartridge may be individually connected to the source of air so that air pressure to each cartridge may be separately regulated. The airflow from holes 25 will be described more completely hereinafter.

A mounting plate 30 is preferably provided to assist in a more focused airflow of the air which emerges from holes 25 and protect the electrodes from possible damage. It can be seen that plate 30 includes five elongate slots 31 which correspond with the holes in each of the positive pressure cartridges. These slots are preferably oriented at an angle to correspond with the angular orientation of the electrodes as described hereinafter.

Each cartridge 20 further includes an electrode 32 which is preferably relatively elongate in nature so that an electrical field may be developed along the length of the electrodes within region 18. It can also be seen in the drawings that each electrode 32 is positioned in its cartridge so that its legs are in holes 22 and 24. Each electrode has its elongate axis angularly oriented with respect to the vertical axis so that an angular arrangement is provided with respect to article movement through the treatment zone. Angular orientation of the electrodes allows for additional treatment time as the articles pass through electrode pairs, as will be pointed out hereinafter. For purposes of the present invention, electrodes 32 may be angularly oriented between 1° and 60° with respect to the vertical axis, and preferably between 10° and 30°. It is understood that while angular orientation of the electrodes is preferred, the principles of the present invention will also be satisfied if the electrodes are mounted substantially vertically, or in some other orientation.

The depth of each plate 30 is preferably designed so that the electrodes are shielded within slots 31 when the electrodes are positioned in holes 22 and 24 of the cartridge. Also, each cartridge 20 should be arranged in side-by-side relationship so that the spacing between each electrode 32 provides a continuous corona field for articles passing through the apparatus. This spacing between electrodes may vary according to the specific treatment at hand and may be in the order of fractions of a centimeter to a few centimeters, or greater.

In the embodiment being described, but without limitation, there are preferably twelve air holes or ports 25 which extend through cartridge 20 and are in fluid communication with the interior of positive pressure side 12. Airflow from positive pressure side 12 thereby emerges out of air ports 25 so that the air creates a uniform shroud or curtain around each electrode on the positive side. From ports 25 air travels transversely across space 18 in the direction toward negative pressure side 14 of the apparatus. When the air travels from the positive pressure side toward the negative pressure side it removes heat from each electrode that is developed during operation.

FIGS. 4 and 5 illustrate more clearly the details of the electrodes on negative pressure side 14 of the apparatus. Mounted against inside wall 34 of the negative pressure side 14 is a series of negative pressure cartridges 35, which in many respects resemble positive pressure cartridges 20. In the embodiment being described and illustrated, there are also five negative pressure cartridges 35 designated by the suffixes a through e. However, instead of a plurality of smaller holes as in the positive pressure cartridge, each negative pressure cartridge has a funnel-shaped slot 36 extending into the cartridge. Slot 36 communicates with a passageway 38 at the back surface of the negative pressure cartridge. Thus, an air passageway is provided through negative pressure cartridge 35 so that air may pass through negative pressure side 14 of the apparatus and exit out of large opening 16 which is preferably connected to a vacuum source or the like.

Each negative pressure cartridge 35 includes two spaced holes 39 and 40. These holes are provided to receive the legs of the electrodes along the same lines that holes 22 and 24 hold the electrodes in positive electrode cartridge 20.

A plate 42 is preferably provided which mounts against inner wall 34 of negative pressure side 14. Plate 42 includes a plurality of slots 44 corresponding with elongate slots 36 of each negative pressure cartridge. The electrodes are slightly recessed in slots 44, and air traveling from positive pressure side 12 enters slots 44 prior to passing through the passageway in the negative pressure cartridges as described above.

Each negative pressure cartridge further includes an electrode 48 which corresponds to an electrode 32 in the opposing positive pressure cartridge, thereby forming, in this instance, five electrode pairs. The electrodes 48 have a preferred elongate structure similar to the electrodes 32 and are also positioned with their legs in holes 39 and 40 and preferably at an angle to match the angular orientation of the above-described electrodes 32. The spacing between electrodes 48 is also similar to that of the electrodes 32 so that, in each electrode pair, electrodes 32 and 48 are substantially directly across from each other. With respect to each electrode pair, electrodes 32 and 48 are spaced in sufficiently close proximity to each other to produce a corona discharge field therebetween when the electrodes are electrically charged. In totality, the five electrode pairs as described herein are employed to create a continuous corona field in the space between electrodes 32 and 48 within region 18. This close stacking of electrode pairs also provides a sufficiently high intensity corona field suitable for continuous treatment of articles passing through the treatment zone. For example, the electrode pairs of the present invention may create a corona field having a watt density range between 20 watts/inch and 30 watts/inch which facilitates the treatment of most plastic surfaces envisioned by the present invention. The actual watt density depends upon the objects being treated and may be much larger, if appropriate.

It is the purpose of air vents or funnel-shaped passageways 36 in the negative pressure cartridges to collect air traveling from the air ports in the positive pressure side of the apparatus and to transport that air through large hole 16 from which it is vented to an appropriate waste area. To facilitate this air collection, a vacuum is provided through large hole 16. Thus, air from positive pressure side 12 traverses region 18 toward negative pressure side 14 at a rate of flow which may be regulated by the apparatus. For purposes of the present invention it is desirable to cause air to flow across region 18 at a rate between 25 and 100 cubic feet per minute.

During transportation of the air across region 18, heat generated by the electrodes is collected and is carried through air vents 36 where such heat may be dissipated downstream after passing through large hole 16. Further, and as mentioned above, ozone is a by-product of the corona discharge developed by the electrodes. The air movement through region 18 also collects ozone developed therein and removes it from the treatment zone. Thus, the controlled airflow through region 18 prevents such ozone from escaping the confined area to thereby control an environmental hazard.

Airflow from the positive pressure side to the negative pressure side of the apparatus facilitates the creation of a uniform corona field for the surface treatment of articles passing therethrough. In cooperation with the high intensity corona field developed by the multiple electrode pairs, the controlled airflow creates a treatment zone which yields uniform surface treatment of articles that move through the treatment zone. It is also believed that the controlled airflow counters any vortex effect which may result from articles moving through the treatment zone at high speeds.

Before explaining the operation of the present invention, a point should be made about the capabilities and functions of the present apparatus. As mentioned above, prior investigations conducted by Baum et al. pointed to the conclusion that the corona discharge treatment of films in moving air causes the excited molecules to be dispersed, particularly downstream, so that their influence will be reduced. Similarly, when charging is done with the material to be treated in motion, the number of excited molecules striking the surface during the short charging period will be reduced. The corona discharge treatment apparatus and technique of the present invention are in direct contradiction to the reported findings of prior investigators. Rather than diminished influence of the charged materials, the present apparatus utilizes closely spaced electrode pairs to create a high intensity corona field. This field is then regulated by a controlled airflow, so that the instant invention produces the capability of continuously treating the surfaces of articles, preferably of discontinuous nature, passing through the controlled corona field.

Figure 6:
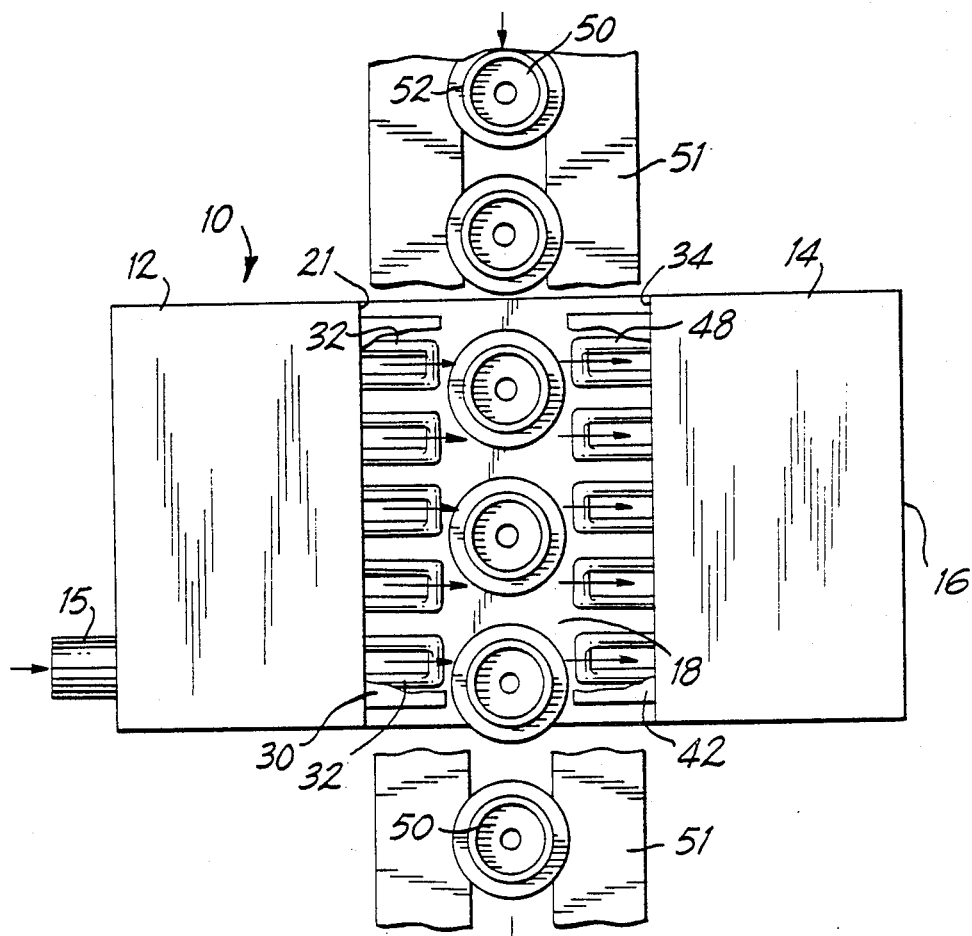
FIG. 6. is a top view of the apparatus of FIG. 1 illustrating formed articles moving through the treatment zone in accordance with the present invention.
Figure 7:
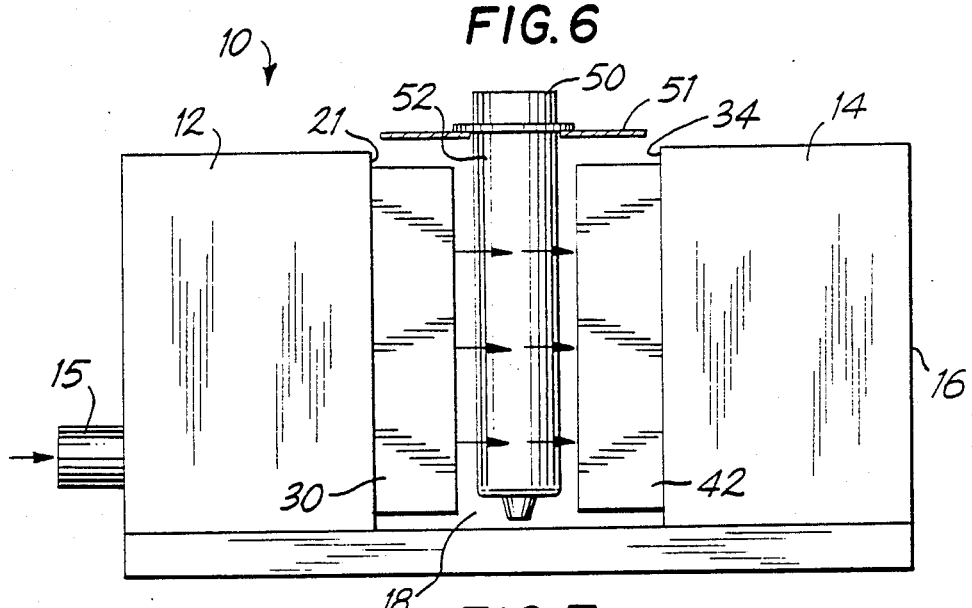
FIG. 7 is an end view of the apparatus of FIG. 6 illustrating a formed article passing through the treatment zone.

Having an appreciation of the explanation of the function of the instant invention, reference is now made to FIGS. 6 and 7 which illustrate apparatus 10 as it may appear during operation. For exemplary purposes only, FIGS. 6 and 7 illustrate the surface treatment of plastic syringe barrels 50. Syringe barrels are good examples of the application of the principles of the present invention since the outside surface of syringe barrels are typically printed with inks, including graduation marks, volume lines, labels, etc. Of course, as mentioned above, the principles of the present invention may be applied to a variety of formed plastic articles wherein printing, bonding and increased surface wetting tension is desired. As used herein, a formed plastic article is, without limitation, an article having a geometric structure or configuration other than a flat film or web, including, but not limited to packages, containers, tubes, pipes, barrels, solid objects, objects with internal cavities, and the like, the shape of the article being regular or irregular, and an outside surface of the article being plastic. Any plastic surface which is subject to molecular modification as a result of ionization or corona discharge treatment may be utilized with the present invention. Polypropylene, polyethylene and polyvinyl chloride articles are representative of the plastics which may be used, however, the aforementioned Ehrbar et al. article includes a number of other plastics which are affected by the corona discharge treatment.

Although separate, independent articles are the preferred types of articles for treatment by the techniques of the subject invention, total separation of surfaces to be treated is not a requirement of the subject invention. Specifically, it is within the purview of the present invention to pass an endless moving strip or tube of material through the treatment zone. If such endless material has continuous or discontinuous surfaces thereon, and those surfaces may be treated on multiple sides or with 360° coverage, then that type of material is amenable to the principles of the present invention.

Returning now to FIGS. 6 and 7, it can be seen that formed plastic articles represented by syringe barrels 50 pass through treatment zone 18 in succession and in spaced relationship to each other, in this embodiment, a moving conveyer belt 51 may be provided through which syringe barrels 50 extend in downward fashion so that, as the syringe barrels move through the treatment zone, they are hanging in a substantially vertical direction. Each syringe barrel 50 has an outside peripheral surface 52 which is substantially cylindrical in shape and which is intended to be treated by the corona discharge field. Conveyor belt 51 may be regulated to transport syringe barrels 50 through treatment zone in continuous motion and at regulated speeds. For instance, the plastic articles may be transported through the apparatus at rates between 1 and 1000 articles per minute, or at different rates where suitable.

While syringe barrels 50 are passing through zone 18, each electrode pair 32 and 48 creates an ionized field, and preferably an electrically charged corona field, so that the multiple electrode pairs produce a high intensity corona field which is continuous throughout the treatment zone between each of the electrode pairs. At the same time, pressurized air is provided to positive pressure side 12 of the apparatus from which the air travels transversely across field 18 toward negative pressure 14 of the apparatus. The arrows in FIGS. 6 and 7 represent the direction of airflow through the apparatus. Air, heat and ozone from treatment zone 18 are collected into negative pressure cartridges 35 for ultimate passage through large hole 16 toward a waste area. As mentioned above, airflow through treatment zone 18 facilitates the creation of a uniform corona field that produces a uniform treatment of surface 52 while the plastic articles are moving through zone 18. The high intensity corona field and the airflow across the treatment zone allow the moving articles to be treated with 360° coverage around the peripheral surface of the articles. Insofar as the corona treatment circumscribes the peripheral surface of the moving articles, it is not necessary for the articles to be rotated during passage through the treatment zone, and it is further not necessary for the articles to be passed more than once for satisfactory treatment. After passing through apparatus 10, syringe barrels 50 have their peripheral surfaces 52 uniformly treated and molecularly modified so that the surfaces demonstrate increased adhesion characteristics as well as increased surface wetting tension. The increase in the adhesion characteristics not only enhances the permanency of the ink subsequently printed on the peripheral surface, but also significantly improves the print quality. Increased surface wetting tension tends to improve the clarity and the darkness of the ink printed on the surface of the plastic article.

Thus, the present invention provides a method and apparatus for treating a surface of a formed plastic article to enhance its printing, bonding and surface wetting tension characteristics. The apparatus of the present invention functions without any moving parts, except for those articles which are moved through the treatment zone for treatment. As a result of the high intensity corona field and airflow through the treatment zone, surfaces of plastic articles may be uniformly treated by the field which circumscribes the peripheral surface to achieve the desired molecular modification of the surface. A variety of formed plastic articles may be surface treated in accordance with the principles of the present invention.

What is claimed is:

1. A method for treating the surface of a formed plastic article comprising:
    creating an electrically-charged corona field in a zone of treatment;
    causing air to flow through said zone; and
    moving a formed plastic, article having a peripheral surface through said corona field in the zone in a continuous motion so that the charged field circumscribes the peripheral surface whereby the corona discharge causes molecular modification of said surface.

2. The method of claim 1 wherein the air is caused to flow in a direction transverse to the movement of the article therethrough.

3. The method of claim 1 wherein the step of creating the field includes providing at least one pair of electrodes in sufficiently close proximity to each other to produce a corona discharge between the electrodes when electrically charged.

4. The method of claim 3 wherein the step of causing air to flow includes flowing air in a direction transverse to the movement of the article therethrough and in a direction from one electrode toward the other electrode.

5. The method of claim 3 wherein the step of creating the field includes providing a plurality of electrode pairs.

6. The method of claim 5 wherein each electrode pair is spaced from the adjacent pair along the direction of movement of the article so that the article passes between all of the electrode pairs when moving through the zone.

7. The method of claim 6 wherein the pairs of electrodes are spaced so that the creating step produces a corona field having an watt density of at least 20 watts per inch.

8. The method of claim 5 wherein the airflow removes heat, generated by the electrodes, and ozone, produced by the corona discharge, from said zone.

9. The method of claim 1 wherein the moving step includes moving a substantially cylindrical article, having a longitudinal axis, through said zone.

10. The method of claim 9 wherein said substantially cylindrical article is moved through said zone so that its longitudinal axis is substantially parallel to the axis of said electrode pairs.

11. The method of claim 9 wherein said substantially cylindrical article is moved through said zone so that its longitudinal axis is substantially perpendicular to the axis of said electrode pairs.

12. A method for treating the surface of a formed plastic article comprising:
creating an ionized field;
causing air to flow through said field; and
moving a formed plastic article through said field and said airflow in a continuous motion so that the ionized field circumscribes the peripheral surface of said article to cause the molecular structure of the surface of said article to be modified.

13. A method for treating surfaces of formed plastic articles comprising:
creating an electrically-charged corona field using a plurality of pairs of electrodes, each electrode of the pair located in sufficiently close proximity to each other to produce a corona discharge between the opposing electrodes, each pair of electrodes being aligned side-by-side in a spaced relationship so that a zone of treatment is established between opposing electrodes;
causing air to flow through said zone in a direction transverse to the direction of article movement through said treatment zone; and
moving a plurality of formed plastic articles through said corona field in the zone in a continuous motion, each article passing through said zone in succession and in spaced relationship to each other, each article having a peripheral surface which is circumscribed by the charged field when passing through said zone whereby the corona discharge causes molecular modification of the surface of each article.

14. The method of claim 13 wherein each plastic article moved through said zone is completely separated from other plastic articles.

15. The articles produced by the method of claim 13.

16. An article produced by the method of claim 12.

17. An article produced by the method of claim 1.

18. The articles of claim 15 which are containers.

19. The articles of claim 15 which are tubes.

20. The articles of claim 15 which are syringe barrels.

21. The article of claim 16 which is a container.

22. The article of claim 16 which is a tube.

23. The article of claim 16 which is a syringe barrel.

24. The article of claim 17 which is a container.

25. The article of claim 17 which is a tube.

26. The article of claim 17 which is a syringe barrel.

27. An apparatus for the surface treatment of a formed plastic article comprising:
a treatment zone for the passage of formed plastic articles therethrough;
means for creating an electrically-charged corona field in said zone; and
means for causing air to flow through said zone so that when a formed plastic article having a peripheral surface is moved in a continuous motion through said corona field in the zone, said means for creating and said means for causing cooperate to cause the charged field to circumscribe the peripheral surface of the article whereby the corona discharge causes molecular modification of said surface.

28. The apparatus of claim 27 wherein said means for creating includes providing at least one pair of electrodes in sufficiently close proximity to each other to produce a corona discharge between the electrodes.

29. The apparatus of claim 28 wherein one of said electrodes is positioned in a positive pressure cartridge and the other electrode is positioned in a negative pressure cartridge.

30. The apparatus of claim 29 wherein the positive pressure cartridge includes means for directing said air flow through said zone toward said negative pressure cartridge and wherein said negative pressure cartridge includes means for receiving said flowing air to transfer same away from said treatment zone.

31. The apparatus of claim 28 wherein each electrode is relatively elongate and is positioned in said apparatus so that its elongate axis is angularly oriented with respect to the direction of article movement through said zone.

32. The apparatus of claim 31 wherein said angle of orientation of the axis of said electrodes is between 1° and 60°.

33. The apparatus of claim 28 wherein there is a plurality of electrode pairs, each pair being spaced from an adjacent pair along the direction of movement of the article.

34. The apparatus of claim 32 wherein there is a plurality of electrode pairs, one electrode of a pair being positioned in a positive pressure cartridge, and the other electrode of a pair being positioned in a negative pressure cartridge, each electrode pair being spaced from an adjacent pair along the direction of movement of the article.

35. The apparatus of claim 34 wherein said electrodes are spaced so that the corona field has a watt density of at least 20 watts per inch.

36. An apparatus for the surface treatment of a formed plastic article comprising:
a treatment zone;
means for creating an ionized field;
means for causing air to flow through said field so that when a formed plastic article is moved through said field and said airflow in a continuous motion, said means cooperate to cause the field to circumscribe the peripheral surface of said article to cause the molecular structure of the surface of the article to be modified.

37. An apparatus for the surface treatment of a formed plastic article comprising:
a plurality of pairs of electrodes, each pair including one electrode positioned in a positive pressure cartridge and the other electrode positioned in a negative pressure cartridge, the electrodes of each pair located in sufficiently close proximity to each other to produce a corona discharge field therebetween, and each pair of electrodes being aligned side-by-side in a spaced relationship so that a zone of treatment is established between opposing electrodes, each positive pressure cartridge including means for directing airflow through said zone toward a negative pressure cartridge, said negative pressure cartridges including means for receiving said flowing air and ozone produced by the corona discharge to transfer same away from said treatment zone, each electrode being relatively elongate and positioned in its cartridge so that its elongate axis is angularly oriented between 1° and 60° with respect to the direction of article movement through said zone, whereby when a formed plastic article having a peripheral surface is moved through said corona field in the zone in a continuous motion said electrodes and said airflow cooperate to cause the charged field to circumscribe the peripheral surface of the article whereby the corona discharge causes molecular modification of said surface.

* * * * *